April 21, 1953  C. H. GUBBINS  2,636,136
ELECTRIC MOTOR
Filed May 24, 1950  2 SHEETS—SHEET 1
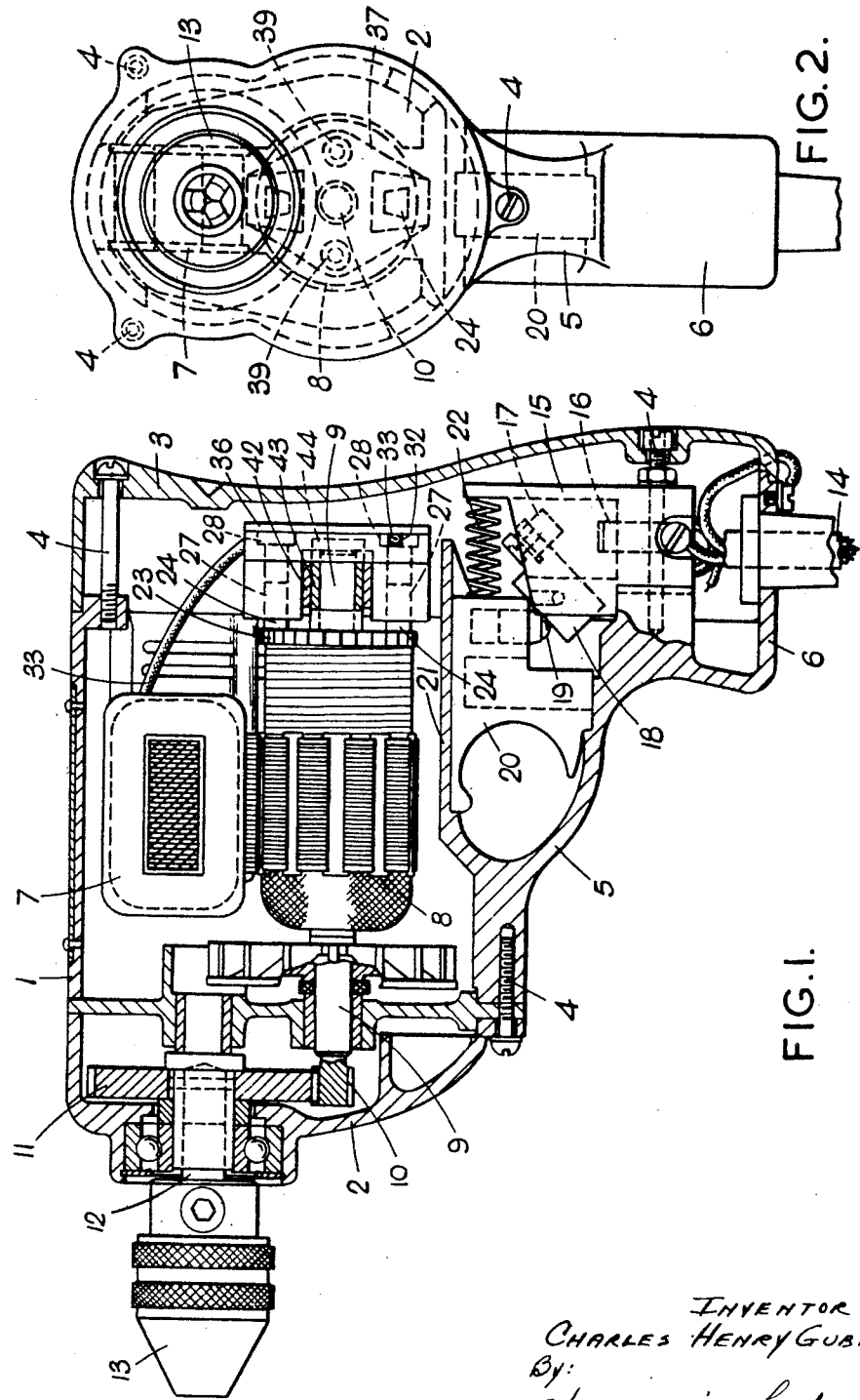
INVENTOR
CHARLES HENRY GUBBINS
By:
Haseltine, Lake & Co.
AGENTS April 21, 1953 C. H. GUBBINS 2,636,136
ELECTRIC MOTOR
Filed May 24, 1950 2 SHEETS—SHEET 2

INVENTOR
CHARLES HENRY GUBBINS
By:
Haseltine, Lake & Co.
AGENTS

Patented Apr. 21, 1953

2,636,136

UNITED STATES PATENT OFFICE 2,636,136

ELECTRIC MOTOR

Charles Henry Gubbins, London, England, assignor to Wolf Electric Tools Limited, London, England, a British company Application May 24, 1950, Serial No. 163,875
In Great Britain March 31, 1950

9 Claims. (Cl. 310—50)

The invention relates to electric motors, the invention being concerned more particularly, although not exclusively, with electric motors of comparatively small horse-power which are required to be accommodated in a confined space, but must nevertheless be reasonably accessible for repair or adjustment. These considerations apply, for example, to electrically driven portable hand tools which, while being self-contained in the sense that their casings contain an electric motor for driving the tool spindle, must nevertheless be of reasonably small dimensions and weight so that they are not too cumbersome and heavy to be supported by one hand while in use.

One of the problems met with in the designing of an electric motor of compact form arises from the disposition of the commutator and its brushes. According to conventional practice, the segments of the commutator extend radially so that their contact faces are at the circumference of the commutator. Concomitantly with this, the brushes must be arranged to extend radially outwards so that their inner ends can bear on the contact faces of the segments. Where the motor has to be mounted in a casing of compact form, such as the casing of a portable hand tool, this arrangement of the brushes represents an inconvenience and frequently necessitates the provision in the casing of capped holes in register with the outer ends of the brushes.

The present invention provides an electric motor with a more compact arrangement of commutator and brushes, making the motor more convenient for installation in confined spaces such as those available within the casings of portable hand tools which are required to be of limited size and which should as far as possible be of clean and pleasing external design.

According to the invention, in an electric motor having a rotor, commutator and brushes, the segments of the commutator are so arranged that their contact faces lie in a plane extending at right-angles to the axis of the rotor, while the brushes extend in the direction of the axis of the rotor.

With the arrangement according to the invention, the brushes can be accommodated in a space whose perimeter coincides with the external diameter of the commutator.

The accompanying drawings illustrate, by way of example, an embodiment of the improved motor when applied to a portable hand tool.

In the drawings:

Figure 1 is a longitudinal sectional view through the tool;

Figure 2 is a front end view of the tool;

Figure 3:
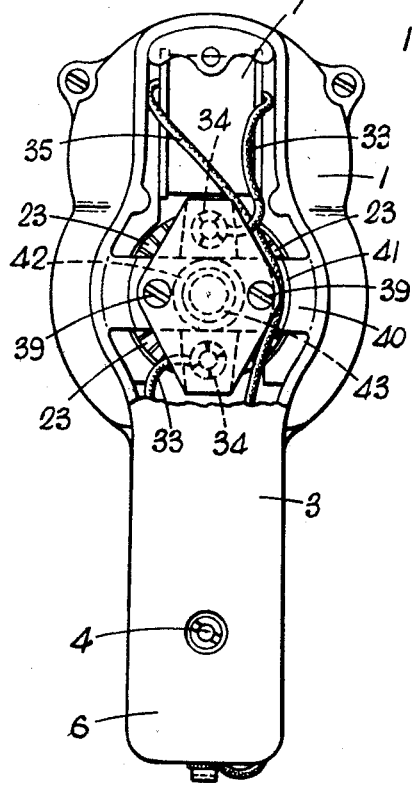
Figure 3 is a rear end view of the tool with part of the casing broken away.

The tool illustrated has an outer casing comprised by a main body part 1, a front end cap 2 and a rear end cap 3, these three parts being held together by screws 4. The lower portion of the main body part 1 is shaped to provide a trigger-guard 5 and part of a hollow hand-grip 6 the remainder of which is constituted by the lower part of the rear end plate 3.

The electric motor is arranged within the outer casing and comprises a field winding 7 and a rotor 8 the shaft 9 of which drives, through toothed wheels 10 and 11, a spindle 12 which projects through the front cover plate 2 and is fitted with a chuck 13 for holding a drill or other implement (not shown).

Current is fed to the motor by a flexible cable 14 which passes through the base of the hand-grip 6 and is adapted to be connected to a source of current supply. Flow of current from the cable 14 to the motor is controlled by a switch comprising a block 15 of electrical insulating material arranged within the hollow hand grip 6 and secured in position by one of the screws 4, the block being fitted with a pair of contact blades 16 adapted to be bridged by contact blades 17 on a tumbler 18 which is supported for a rocking movement on the block 15 so that it can be moved from "off" to "on" position and vice versa. For actuating the tumbler 18 there is provided a spring-pressed ball 19 carried by a trigger 20 which is mounted for a sliding movement on a guideway formed by a rearward extension of the inner edge of the trigger-guard 5 and the lower surface of an internal web 21 formed on the main body part 1, the trigger being normally maintained in a forward position by a spring 22.

The switch and trigger mechanism forms no essential part of the present invention.

Figure 4:
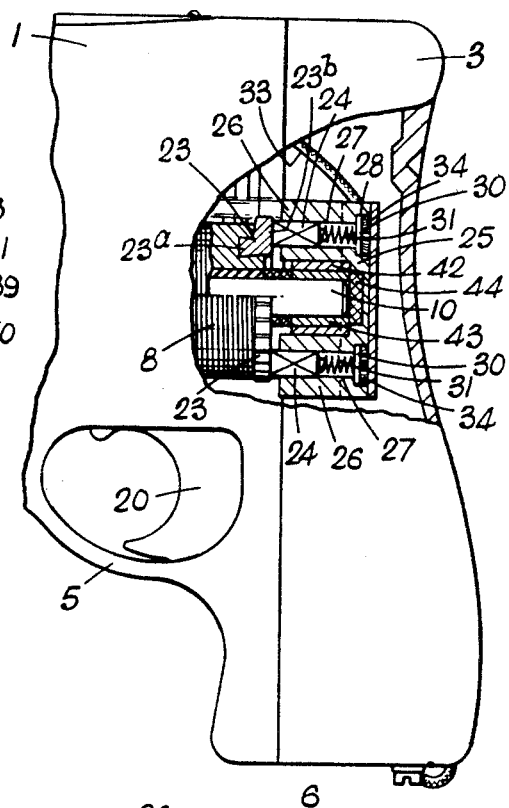
Figure 4 is a side view, partly in section, of the rearward part of the tool.
Figure 5:
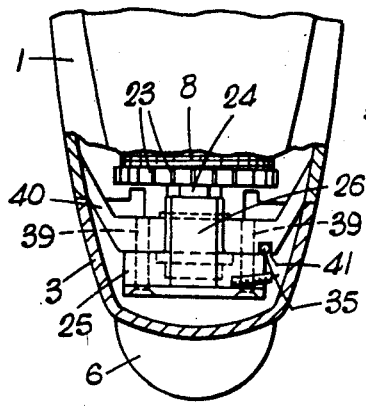
Figure 5 is a plan view, partly in section, corresponding to Figure 4.

The commutator of the rotor 8 is made up of segments 23 arranged in a circle around the end portion of the rotor shaft opposite that having the toothed wheel 10, the segments being keyed into the corresponding end of the body of the rotor. For this purpose, and as shown in Figure 4, each segment is made substantially of reversed L-shape, the horizontal limb being formed as a dovetail 23a which is embraced by the material of the rotor body. The outer faces 23b of the vertical limbs of the segments, that is to say, the faces opposite those from which the dovetails 23a develop, are flat and extend in a plane lying at right-angles to the rotor axis, these faces constituting the contact faces of the commutator.

The brushes 24 extend parallelly to to the axis of the rotor 8 so that their inner ends bear on the contact faces 23b of the segments 23. The motor illustrated has two such brushes arranged diametrically opposite each other.

The brushes 24 are of wedge-shape in cross-section and are supported by a brush-holder constituted by a block of electrical insulating material formed with a flange 25 from the inner face of which extend two spaced legs 26. The brushes fit slidably in holes 27, also of wedge-shape in cross-section, extending longitudinally through the legs 26 and communicating at their outer ends with cylindrical countersinks 28 formed in the outer face of the flange 25.

Figure 6:
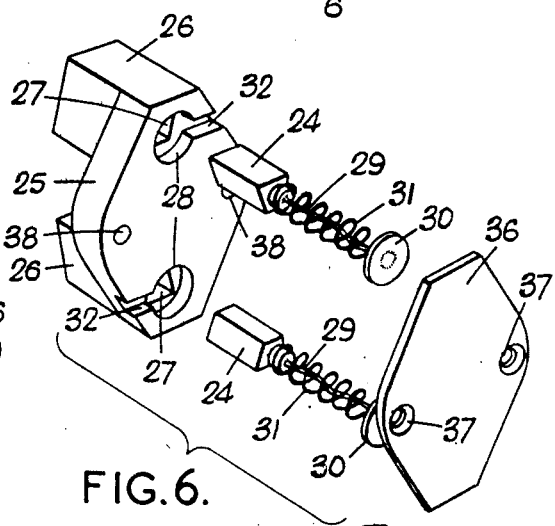
Figure 6 is a perspective view illustrating the brushes and their holder.

The outer ends of the brushes are provided with pigtails 29 (Figure 6) of flexible wire the free ends of which are joined to contact caps 30 (Figures 4 and 6) adapted to fit snugly in the countersinks 28 of the brush-holder, compression springs 31 being arranged around the pigtails 29 and acting between the outer ends of the brushes 24 and the inner faces of the contact caps 30. The pigtails are made of such lengths that, when a brush is inserted in its hole 27 so that its inner end bears on the commutator segments 23, a part of the spring 31 and the contact cap 30 will protrude from the countersink 28.

Slots 32 (Figures 1 and 6) project radially from the countersinks 28 to the outer edges of the flange 25 of the brush holder. When the brushes 24 have been fitted in their holes 27 and the springs 31 have been compressed so that the contact caps 30 are accommodated in the countersinks 28, the slots 32 allow for passage of insulated electric leads 33 from the switch mechanism to the brush holder and from the latter to the field winding 7, the ends of the lead wires associated with the brush holder being fitted with metal eyelets 34 which are also accommodated in the countersinks 28 and bear against the contact caps 30.

The circuit through the motor is completed by another lead indicated at 35 in Figure 3.

The whole of the brush holder assembly, including the brush holder itself, the brushes 24, springs 31, contact caps 30 and eyelets 34, is held in operative position by means of a cover plate 36 of electrical insulating material applied to the outer face of the brush holder, the cover plate being provided with holes 37 (Figure 6) in register with holes 38 in the flange 25 of the brush holder, these registering holes providing passages for screws 39 which are threaded into a bridge-piece 40 formed integrally with the main body part 1 of the tool casing.

When the cover plate is in secured position, it acts to close the countersinks 28, thereby retaining the brush springs 31 in compression, with the result that the springs act not only to maintain the inner ends of the brushes 24 against the contact faces of the commutator segments 23, but also to maintain the contact caps 30 in engagement with the eyelets 34. Good and lasting electrical connections are thereby assured.

When it is desired to renew the brushes 24, it suffices merely to remove the cover plate 36, whereupon the eyelets 34 will be pressed out of the countersinks 28 by the reaction of the springs 31 and the brushes can then be removed by endwise movement.

The lead 35 can be held against looseness between its ends by passage through a groove 41 in the bridge-piece 40, the groove being overlapped by an edge of the flange 25 of the brush-holder when the latter has been secured in position.

The space between the legs 26 of the brush holder is made large enough to accommodate a bearing bush 42 in which rotatably fits a complementary bearing bush 43 on the corresponding end of the rotor shaft 10. For lubricating the running surfaces, the end of the said space nearest the flange 25 is formed with a recess accommodating a lubricant-impregnated washer 44 in contact with the bush 43.

Apart from the fact that the commutator and brush arrangement of the invention is of simple construction and of compact form and lends itself to the ready removal of the brushes when desired, the arrangement has the further advantage that as the brushes have end-contact with the commutator segments 23 and the brush springs 31 apply their thrust in the direction of the rotor axis, the rotor is restrained against end-play. End-play is a common fault with designs in which the brushes are arranged radially and results in noise, chatter and excessive wear on the brushes and bearings.

I claim:

1. An electric motor including a rotor, a segmental commutator whereof the segments are arranged so that their contact faces lie in a plane situated at right angles to the axis of the rotor, a brush-holder arranged endwise of the rotor and formed with a flange having spaced legs extending towards the rotor, holes extending through said flange and legs from one face of the brush-holder to the other, said holes being arranged in parallelism with the axis of the rotor, brushes mounted slidably in said holes so that they also extend in parallelism with the axis of the rotor, a cover plate detachably secured to that face of the brush-holder which is remote from the rotor, and springs maintained under compression by the cover plate and bearing on one end of the brushes so as to maintain the other end of the brushes in engagement with the contact faces of the commutator segments.

2. An electric motor according to claim 1, wherein the space between the legs of the brush-holder accommodates a bearing for the rotor shaft.

3. An electric motor including a rotor, a segmental commutator whereof the segments are arranged so that their contact faces lie in a plane situated at right angles to the axis of the rotor, a brush-holder arranged endwise of the rotor and formed with a flange having spaced legs extending towards the rotor, holes extending through said flange and legs from one face of the brush-holder to the other, said holes being arranged in parallelism with the axis of the rotor, brushes mounted slidably in said holes so that they also extend in parallelism with the axis of the rotor, a cover plate detachably secured to that face of the brush-holder which is remote from the rotor, and springs maintained under compression by the cover plate and bearing on one end of the brushes so as to maintain the other end of the brushes in engagement with the contact faces of the commutator segments, said holes in the brush-holder communicating with countersinks in that face of the flange thereof which is remote from the rotor, said countersinks accommodating contact caps which are electrically connected to the brushes.

4. An electric motor according to claim 3, wherein grooves extend from said countersinks to the edges of the flange, said grooves providing passages for electric leads whereof the wires have metal eyelets fittting in the countersinks and bearing on the contact caps.

5. An electric motor comprising a rotor, a segmental commutator whereof the segments are arranged so that their contact faces lie in a plane situated at right angles to the axis of the rotor, a brush-holder arranged endwise of the rotor and secured to a casing containing the motor, holes extending through the brush-holder from one face thereof to the other and in the direction of the axis of the rotor, brushes mounted slidably in said holes, countersinks at the ends of the holes remote from the rotor, contact caps accommodated in said countersinks and electrically connected to the brushes, grooves extending from said countersinks to the sides of the brush-holder, metal eyelets fitting in the countersinks and bearing on said contact caps, electric leads passing through said grooves and whereof the wires are connected to said eyelets, a cover plate detachably secured to the face of the brush-holder remote from the rotor, and springs arranged between the brushes and the cover plate, said plate acting to retain the contact caps and eyelets in the countersinks and to compress the springs so that the brushes are pressed into engagement with the contact faces of the commutator segments.

6. An electric motor including a rotor, a segmental commutator, the segments of the commutator being embraced by the material of the rotor and having contact faces which lie in a plane extending at right angles to the axis of the rotor, a common brush-holder arranged endwise of the rotor, holes extending through the brush-holder from one face thereof to the other parallel to the axis of the rotor, brushes mounted slidably in said holes, springs extending rearwardly of said brushes, a cover plate secured to the face of the brush-holder remote from the rotor and co-operating with the said springs to keep the brushes in engagement with the commutator.

7. A portable electrically driven hand tool comprising a casing, an electric motor within the casing and a tool spindle projecting through the casing and adapted to be driven by said motor, wherein the motor includes a rotor; a segmental commutator, the segments of the commutator being embraced by the material of the rotor and having contact faces which lie in a plane extending at right angles to the axis of the rotor, a common brush-holder arranged endwise of the rotor, said brush-holder having holes extending therethrough from one face thereof to the other parallel to the axis of the rotor, brushes mounted slidably in said holes, springs extending rearwardly of said brushes, a cover plate secured to the face of the brush-holder remote from the rotor and co-operating with said springs to keep the brushes in engagement with the commutator.

8. In an electric motor including a rotor and a segmental commutator having segments embraced by the material of the rotor and formed with contact faces which lie in a plane at right angles to the axis of the rotor; a brush assembly comprising a brush holder arranged endwise of the rotor, said brush holder having at least a pair of holes extending completely therethrough and parallel to the axis of the rotor, brushes mounted slidably in said holes, a cover plate secured to the face of said brush holder remote from the rotor, and springs interposed directly between said cover plate and said brushes to maintain the latter in engagement with the contact faces of the commutator segments.

9. In an electric motor; a brush assembly according to claim 8, wherein said holes have countersunk portions at the ends thereof opening at said remote face of the brush holder and the latter is formed with laterally extending slots in said remote face between said countersunk portions and side edges of said remote face, and including contact caps electrically connected to said brushes and spaced from the latter by said springs, and electrical conductors extending through said slots and connected to metallic contact discs disposed in said countersunk portions between said contact caps and said cover plate whereby said springs also serve to maintain intimate electrical contact between said contact caps and discs.

CHARLES HENRY GUBBINS.

References Cited in the file of this patent

UNITED STATES PATENTS

| Number | Name | Date |
|---|---|---|
| 1,315,796 | Scott | Sept. 9, 1919 |
| 1,468,307 | Marx | Sept. 18, 1923 |
| 1,643,191 | Welch | Sept. 20, 1927 |
| 2,082,264 | Scruggs | June 1, 1937 |
| 2,436,540 | Allenby | Feb. 24, 1948 |

FOREIGN PATENTS

| Number | Country | Date |
|---|---|---|
| 475,974 | Great Britain | Nov. 30, 1937 |